United States Patent
Elder et al.

(10) Patent No.: US 6,810,120 B1
(45) Date of Patent: Oct. 26, 2004

(54) METHOD OF DETERMINING ANSWER SUPERVISION AT A LINE APPEARANCE OF A PUBLIC SWITCH TELEPHONE NETWORK

(75) Inventors: Michael J. Elder, Wheaton, IL (US); Joseph J. Kott, Aurora, IL (US); Raymond L. Ruggerio, Glenview, IL (US); Jane A. Thompson, Batavia, IL (US); Robin J. Thompson, Batavia, IL (US); Kimberly S. Tomasko-Dean, LaGrange, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/570,617

(22) Filed: May 15, 2000

(51) Int. Cl.$^7$ .............................. H04M 1/00
(52) U.S. Cl. ..................... 379/377; 379/350
(58) Field of Search ............... 379/377, 382, 379/384, 386, 380, 381, 387.01, 388.07, 290, 230

(56) References Cited

U.S. PATENT DOCUMENTS

| | | | | |
|---|---|---|---|---|
| 4,224,472 A | * | 9/1980 | Zarount ..................... 379/144 |
| 4,447,673 A | * | 5/1984 | Elliott et al. ........... 379/144.01 |
| 4,809,272 A | * | 2/1989 | Torgrim et al. ............. 379/386 |
| 6,111,946 A | * | 8/2000 | O'Brien ...................... 379/230 |

* cited by examiner

Primary Examiner—Rexford Barnie

(57) ABSTRACT

Audible ring, which is provided to all line appearances, is detected and used to determine whether or not a far end party has answered, i.e., answer supervision, for equipment connected to the line appearance which requires answer supervision for proper operation. The line appearance is monitored to detect ringing tone received at the line appearance within a first period of time from call origination. If ringing tone is not detected at the line appearance within the first period of time, receipt of answer supervision is indicated. If ringing tone is detected at the line appearance within the first period of time, the timing for the first period of time is canceled and timing for a second period of time is started from the cancellation of timing for the first time period. The timing for the second period of time is restarted each time ringing tone is detected at the line appearance during the second period of time with receipt of answer supervision being indicated if ringing tone is not detected within the second period of time.

5 Claims, 3 Drawing Sheets

METHOD OF DETERMINING ANSWER SUPERVISION AT A LINE APPEARANCE OF A PUBLIC SWITCH TELEPHONE NETWORK

BACKGROUND OF THE INVENTION

The present invention relates, in general, to the connection of an originating network node to a network switch via a line appearance and, more particularly, to the determination of answer supervision at the line appearance by the originating network node.

In many instances, far party answer supervision cannot be passed backwards through the telephone network to an originating network node which is connected to a line appearance of a network switch. Unfortunately, some recent applications require answer supervision to the originating network node for proper operation. Accordingly, there is a need for a method for an originating node which is connected to a line appearance of a network switch to determine answer supervision from signaling which is present at the line appearance. Preferably, this method would be simple to implement and reliable in determining answer supervision.

SUMMARY OF THE INVENTION

This need is met by the invention of the present application wherein audible ring, which is provided to all line appearances, is detected and used to determine whether or not a far end party has answered, i.e., answer supervision, for equipment connected to the line appearance which requires answer supervision for proper operation.

In accordance with one aspect of the present invention, a method of determining answer supervision at a line appearance of a public switch telephone network comprises monitoring the line appearance to detect ringing tone received at the line appearance and timing for a first period of time from call origination. If ringing tone is not detected at the line appearance within the first period of time, receipt of answer supervision is indicated. If ringing tone is detected at the line appearance within the first period of time, the timing for the first period of time is canceled and timing for a second period of time is started from the cancellation of timing for the first time period. The timing for the second period of time is restarted each time ringing tone is detected at the line appearance during the second period of time with receipt of answer supervision being indicated if ringing tone is not detected within the second period of time.

Timing for the first period of time preferably comprises timing for a period of time substantially equal to ringing tone cycle time plus post dial delay time for the public switch telephone network. Timing for the second period of time preferably comprises timing for a period of time substantially equal to ringing tone cycle time.

In accordance with another aspect of the present invention, a method of determining answer supervision at a line appearance of a public switch telephone network comprises monitoring the line appearance for receipt of ringing tone, indicating receipt of answer supervision if ringing tone is not received, and indicating receipt of answer supervision if ringing tone is initially received and is terminated.

Indicating receipt of answer supervision if ringing tone is not received preferably comprises indicating receipt of answer supervision if ringing tone is not received within a first period of time substantially equal to ringing tone cycle time plus post dial delay time for the public switch telephone network. Indicating receipt of answer supervision if ringing tone is initially received and is terminated preferably comprises timing for a second period of time substantially equal to ringing tone cycle time, restarting the timing for a second period of time each time ringing tone is detected within the second period of time, and indicating receipt of answer supervision upon expiration of the second period of time.

In accordance with yet another aspect of the present invention, apparatus for determining answer supervision at a line appearance of a public switch telephone network comprises a ringing detector coupled to the line appearance to detect ringing tone received at the line appearance. A first timer times a first period of time from call origination with receipt of answer supervision being indicated if ringing tone is not detected at the line appearance within the first period of time and the timing for a first period of time is cancelled if ringing tone is detected at the line appearance within the first period of time. A second timer times for a second period of time from cancellation of the timing for the first time period, the second timer being restarted for the second period of time if ringing tone is detected at the line appearance during the second period of time. Receipt of answer supervision is indicated if ringing tone is not detected within the second period of time.

In accordance with still another aspect of the present invention, apparatus for determining answer supervision at a line appearance of a public switch telephone network comprises a ringing detector coupled to the line appearance to detect ringing tone received at the line appearance. Receipt of answer supervision is indicated if ringing tone is not received, and receipt of answer supervision is indicated if ringing tone is initially received and is terminated.

In accordance with an additional aspect of the present invention, apparatus for determining answer supervision at a line appearance of a public switch telephone network comprises a switch and a ringing detector coupled to the line appearance to detect ringing tone received at the line appearance. The switch is programmed to indicate receipt of answer supervision if ringing tone is not received, and if ringing tone is initially received and is terminated.

DETAILED DESCRIPTION OF THE INVENTION

Figure 1:
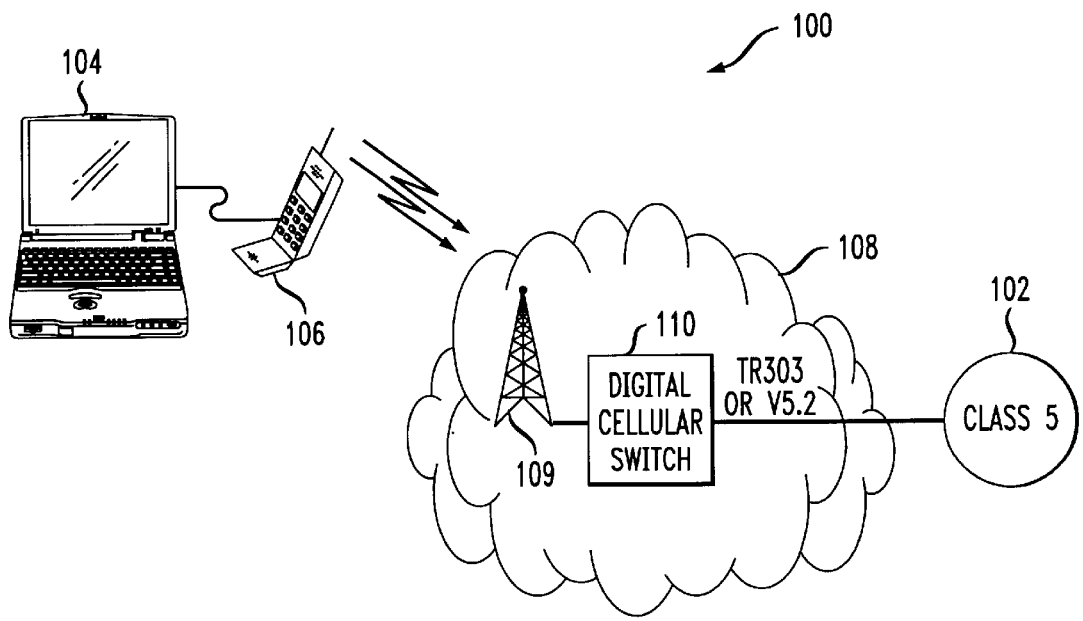
FIG. 1 is a block diagram of a connection of a wireless circuit mode data call to a Class 5 central office.
Figure 2:
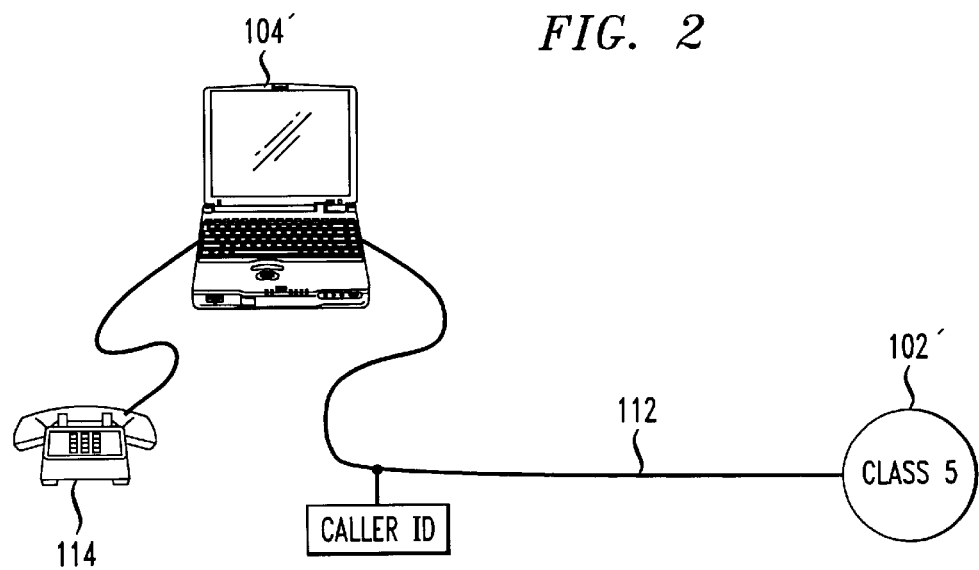
FIG. 2 is a block diagram of a conventional wireline connection of a circuit mode data call to a Class 5 central office.

While the present invention can be used in any application where answer supervision is required by an originating network node or other equipment which is connected to a line appearance of a network switch, it will be described herein with reference to a wireless circuit mode data call for which it is particularly applicable and initially being used. Reference will now be made to the drawings wherein FIG. 1 is a block diagram of a representative connection 100 to a class 5 central office 102 of the public switch telephone network (PSTN). As illustrated, a computer 104 of a cellular customer is connected to a cellular telephone 106 which is shown as communicating via a cell site 109 with a wireless digital loop carrier (WDLC) 108, for example a 5ESS digital cellular switch (DCS) 110 which is commercially available from Lucent Technologies. The WDLC 108 is then connected to the Class 5 central office 102 using, for example, conventional TR303 or V5.2 links. The WDLC 108 makes the cellular customer appear as a standard land line appearance to the Class 5 central office 102 giving the customer wireline services on a wireless telephone, i.e., the cellular telephone 106. Such a conventional wireline connection is shown in FIG. 2 wherein a computer 104' is connected to the Class 5 central office 102' directly via a wireline 112 with a conventional wireline telephone 114 being shown connected to the computer 104' for alternate connection to the Class 5 central office 102' in a conventional manner.

Figure 3:
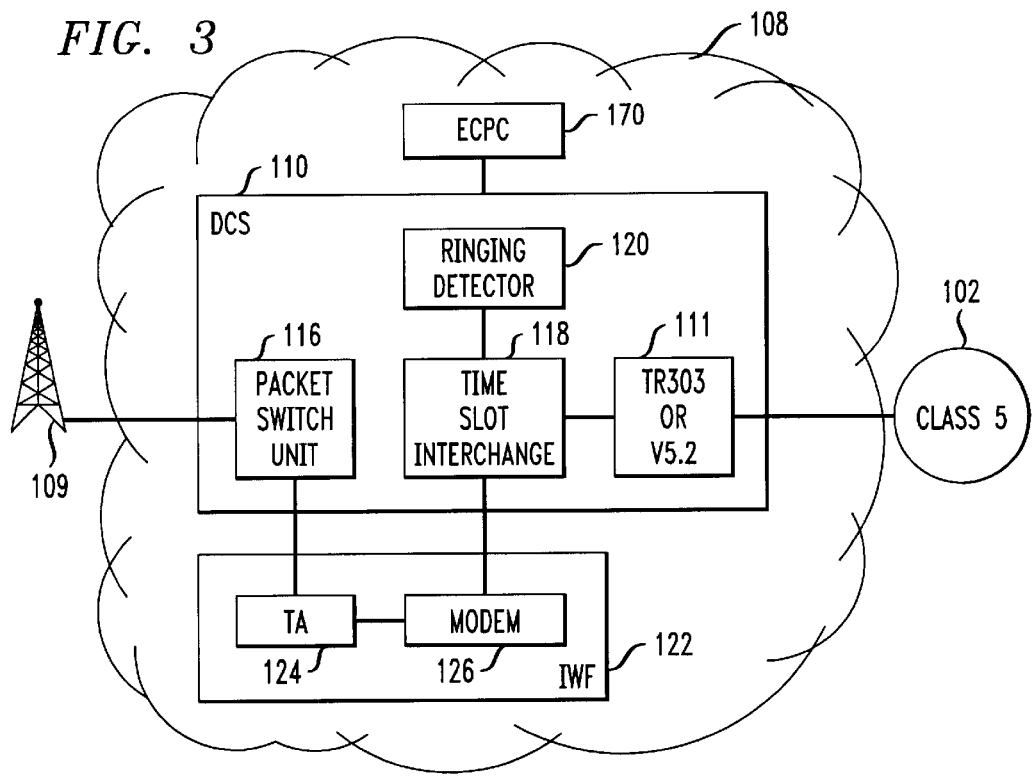
FIG. 3 is a block diagram illustrating the structure of a wireless digital loop carrier of FIG. 1 which is operable in accordance with the present invention.

FIG. 3 is a block diagram illustrating the structure of the WDLC 108 of FIG. 1 for operation in accordance with the present invention. The WDLC 108 includes the DCS 110, a TR303 interface 111, a packet switch unit 116 for routing data packets, a timeslot interchange unit (TSIU) 118 for routing calls and a ringing tone detector 120. The ringing tone detector 120 can be implemented in a variety of ways as known to those skilled in the art. For example, the ringing tone detector 120 can be implemented in a conventional manner in software, hardware or, as software controlled hardware and is coupled to the TSIU 118. An executive cellular processor complex (ECPC) performs the central processing between the cell site 109 and the DCS 110. A data interworking function (IWF) 122 is interconnected to the DCS 110 to convert the packetized data from the DCS 110 to a modem signal that can be sent over the PSTN. The IWF 122 includes a terminal adapter (TA) 124 which interfaces the packet switch unit 116 to a modem 126. The problem which the present invention addresses results from the inability of the TR303 interface 111 to support answer supervision on all line appearances and the protocol used with the IWF 122 requires the DCS 110 to signal when the far end answers a call. For example, answer supervision can be provided on special lines, such as those used to connect pay phones; however, normal end user lines with desired features, such as caller ID, normally do not have answer supervision capability. Normally, the DCS 110 detects far end answer via ISDN user part (ISUP) trunk signaling and sends a connect message to the IWF 122 so that it can connect or train with the far end modem or facsimile. Without an indication from the far end that the far end has answered the call, reliable originating data connections cannot be realized for the WDLC 108. Answer supervision is also required for billing purposes in that it is used to mark the start of a call for billing purposes.

The present invention overcomes this problem by enabling the originating network node or DCS 110 to determine far end answer by means of the audible ring which is provided from the PSTN via the Class 5 central office 102. More particularly, answer supervision is presumed to exist when audible ringing tone is initially detected and then eventually is no longer detected or, in cases when call connection takes place before audible ringing tone is present, presuming that answer has occurred, for example after a post dial delay plus the ringing tone cycle time.

Figure 4:
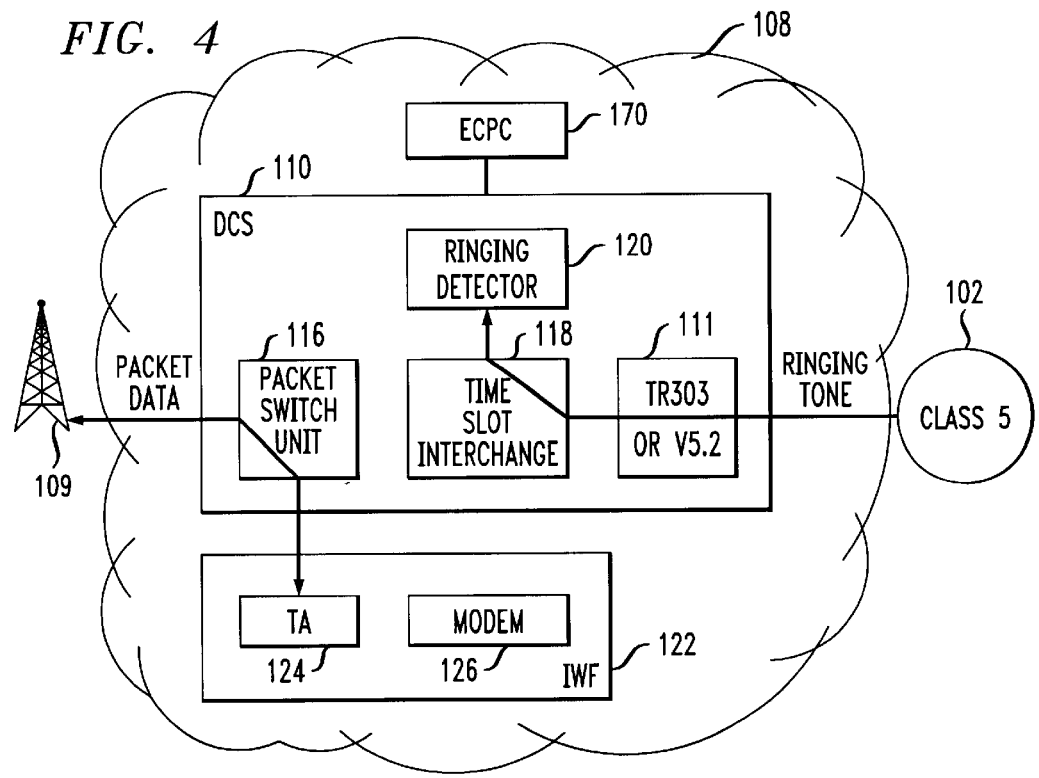
FIG. 4 is a block diagram illustrating detection and monitoring of audible ringing tone to determine answer supervision in accordance with the present invention.
Figure 5:
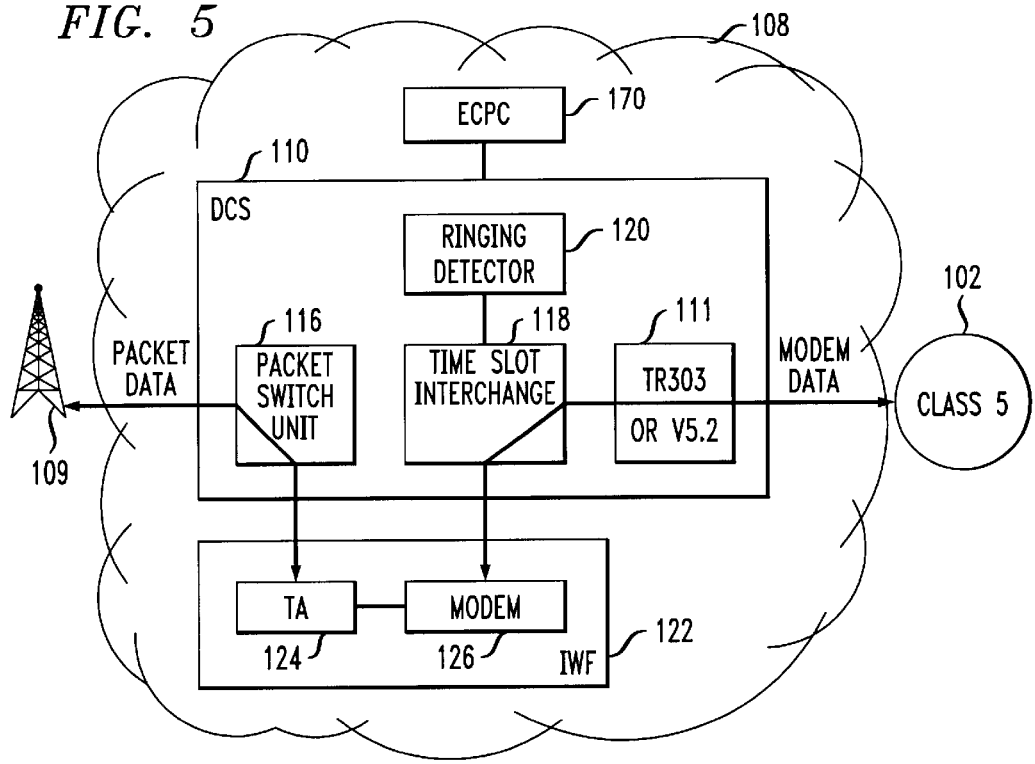
FIG. 5 is a block diagram illustrating call connection after answer supervision has been determined.
Figure 6:
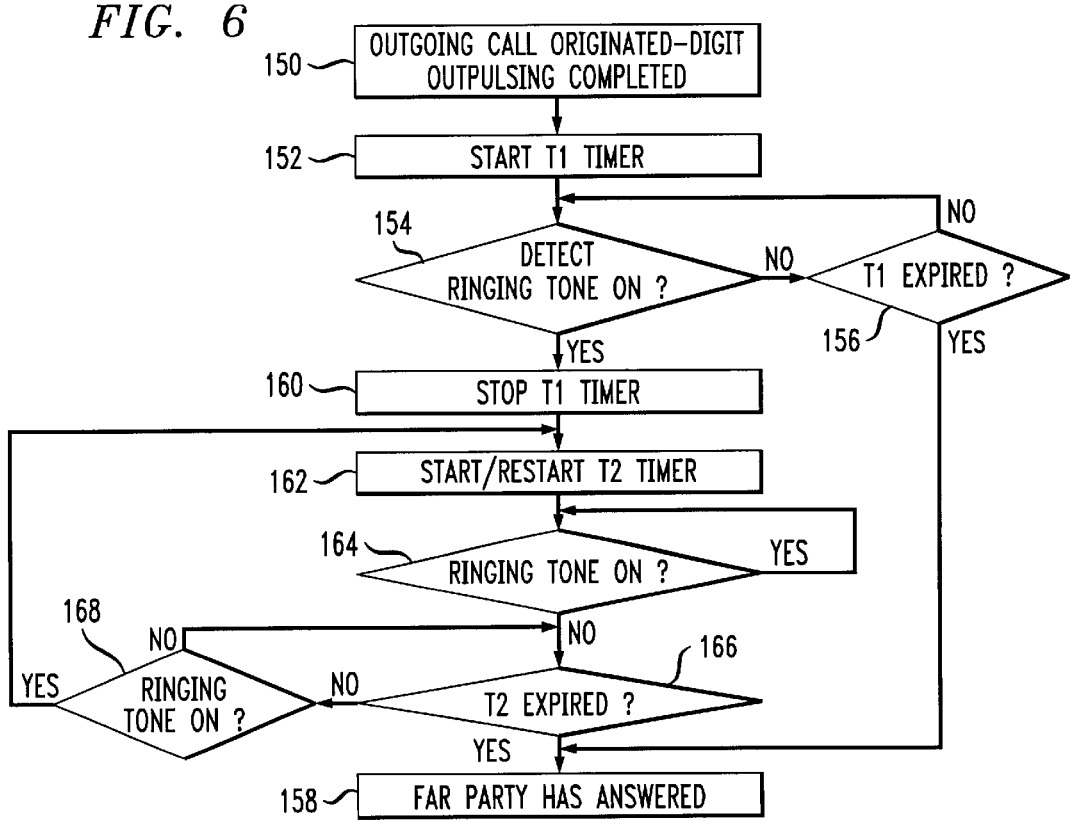
FIG. 6 is a flow chart illustrating determination of answer supervision in accordance with the present invention.

FIG. 4 is a block diagram illustrating detection and monitoring of audible ringing tone by the WDLC 108. During setup of a wireless circuit mode data call, the ringing tone detector 120 is controlled by the DCS to monitor for audible ringing tone. In particular, as shown in FIG. 6, once the outgoing call has been originated and outpulsing of the corresponding called number has been completed, a first timer T1 is started under control of the DCS 110, see blocks 150, 152. The ringing tone detector 120 is activated to detect whether ringing tone is on, see block 154. If ringing tone has not been detected and the timer T1 has not expired, the ringing tone detector 120 continues to monitor for ringing tone, see blocks 154,156. If timer T1 expires without audible ringing tone having been detected, it is presumed that the far end has answered and the call is setup, see block 158 and FIG. 5. The time period for the timer T1 is set to substantially equal the ringing tone cycle time plus post dial delay time normally encountered in the PSTN. To ensure reliability, it is preferred to include a small additional amount of time in the time period for the timer T1 to accommodate normal tolerances within the PSTN. A common ringing tone cycle time is equal to approximately six seconds with audible ringing tone being applied for four seconds followed by two seconds without ringing tone applied, i.e., silence. The post dial delay preferably is set to the maximum likely to be encountered in the PSTN but can be selected to an appropriate period of time dependent upon the experience of a particular DCS.

If the timer T1 has not expired and audible ringing tone is detected, the timer T1 is stopped and a timer T2 is started under the control of the DCS 110, see blocks 154, 160,162. After the timer T2 is started, audible ringing tone continues to be monitored, see block 164. When audible ringing tone stops, a check is made to see whether the timer T2 has expired, see block 166. If the timer T2 has not expired, the ringing tone detector 120 continues to check for the renewal of audible ringing tone, see block 168. If the timer T2 expires before ringing tone is once again detected, it is presumed that the far end has answered and the call is setup, see the block 158. However, if audible ringing tone is once again detected, the timer T2 is reset/restarted and the process continues. The time period for the timer T2 is set to substantially equal the audible ringing tone cycle time. To ensure reliability, it is preferred to include a small additional amount of time in the time period for the timer T2 to accommodate normal tolerances within the PSTN.

The determination of answer supervision based on audible ringing tone is substituted for the answer indication that is normally received on trunks, e.g., ISUP trunks. Audible ringing tone monitoring is performed only upon demand from the ECPC 170. Accordingly, additional data is stored in the ECPC 170 to identify lines for which answer supervision is determined using audible ringing tone detection as described so that the ECPC 170 can appropriately control the DCS 110 to monitor audible ringing tone as described. After it has been determined that far end answer has occurred, the WDLC 108 connects the customer path through the IWF 122 as shown in FIG. 5.

While the present invention has been described with reference to a wireless circuit mode data call, it should be apparent from the above description that answer supervision can be determined by essentially any equipment connected to a line appearance of a network switch of the PSTN by monitoring audible ringing tone as disclosed in the present application.

Having thus described the invention of the present application in detail and by reference to preferred embodiments thereof, it will be apparent that modifications and variations are possible without departing from the scope of the invention defined in the appended claims.

What is claimed is:

1. A method of determining answer supervision at a line appearance of a public switch telephone network, said method comprising the steps of:

monitoring said line appearance to detect ringing tone received at said line appearance;

timing for a first period of time from call origination;

indicating receipt of answer supervision if ringing tone is not detected at said line appearance within said first period of time;

canceling said timing for a first period of time if ringing tone is detected at said line appearance within said first period of time;

timing for a second period of time from canceling said timing for said first time period;

restart timing for said second period of time if ringing tone is detected at said line appearance during said second period of time; and indicating receipt of answer supervision if ringing tone is not detected within said second period of time.

2. A method of determining answer supervision at a line appearance of a public switch telephone network as claimed in claim 1 wherein said step of timing for a first period of time comprises the step of timing for a period of time substantially equal to ringing tone cycle time plus post dial delay time for said public switch telephone network.

3. A method of determining answer supervision at a line appearance of a public switch telephone network as claimed in claim 2 wherein said step of timing for a second period of time comprises the step of timing for a period of time substantially equal to ringing tone cycle time.

4. A method of determining answer supervision at a line appearance of a public switch telephone network said method comprising the steps of:

monitoring said line appearance for receipt of ringing tone;

indicating receipt of answer supervision if ringing tone is not received within a first period of time; and step of indicating receipt of answer supervision if ringing tone is initially received and is terminated comprises by performing the steps of:

timing for a second period of time substantially equal to ringing tone cycle time;

restarting said timing for a second period of time each time ringing tone is detected within said second period of time; and indicating receipt of answer supervision upon expiration of said second period of time.

5. Apparatus for determining answer supervision at a line appearance of a public switch telephone network comprising:

a ringing detector coupled to said line appearance to detect ringing tone received at said line appearance;

a first timer timing a first period of time from call origination, wherein receipt of answer supervision is indicated if ringing tone is not detected at said line appearance within said first period of time and said timing for a first period of time is cancelled if ringing tone is detected at said line appearance within said first period of time; and a second timer timing for a second period of time from cancellation of said timing for said first time period, said second timer being restarted for said second period of time if ringing tone is detected at said line appearance during said second period of time, wherein receipt of answer supervision is indicated if ringing tone is not detected within said second period of time.

* * * * *